US012715326B2

(12) United States Patent
Kimura et al.

(10) Patent No.: US 12,715,326 B2
(45) Date of Patent: Aug. 25, 2026

(54) POWER STORAGE MANAGEMENT SYSTEM AND VEHICLE

(71) Applicant: HONDA MOTOR CO., LTD., Tokyo (JP)

(72) Inventors: Toru Kimura, Offenbach/Am Main (DE); Martin Kopp, Offenbach/Am Main (DE); Christian Koebel, Offenbach/Am Main (DE); Hisashi Nagaoka, Offenbach/Am Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 877 days.

(21) Appl. No.: 17/972,929

(22) Filed: Oct. 25, 2022

(65) Prior Publication Data

US 2023/0150381 A1 May 18, 2023

(30) Foreign Application Priority Data

Nov. 17, 2021 (JP) ................................ 2021-186848

(51) Int. Cl.
*H02J 7/00* (2026.01)
*B60L 53/30* (2019.01)
(Continued)

(52) U.S. Cl.
CPC ............... *B60L 53/31* (2019.02); *B60L 53/32* (2019.02)

(58) Field of Classification Search
CPC .......... B60L 53/00; B60L 53/30; B60L 53/31; B60L 53/32; B60L 53/60; B60L 53/62;
(Continued)

(56) References Cited

U.S. PATENT DOCUMENTS 8,725,331 B2 * 5/2014 Yoshida .................. B60L 55/00 701/22
2014/0266004 A1 * 9/2014 Andrews, Jr. ........... B60L 58/12 320/108

(Continued)

FOREIGN PATENT DOCUMENTS

CN 108189658 A 6/2018
CN 113366727 A 9/2021

(Continued)

OTHER PUBLICATIONS

Japanese Office Action dated Oct. 31, 2023, Japanese Application No. 2011-86848, English translation included, 13 pages.

(Continued)

*Primary Examiner* — Alexis B Pacheco
(74) *Attorney, Agent, or Firm* — Rankin, Hill & Clark LLP

(57) ABSTRACT

To provide a power storage management system capable of more effectively utilizing an electric moving body, whose power source is electric power as an asset of an electric power source.

A power storage management system 1 includes: a travel plan recognition unit 11 for recognizing a travel plan of a user; a moving body waiting period estimation unit 13 for estimating a waiting period based on the travel plan, the waiting period being a period through which the user is to leave an electric moving body **60*a* in a predetermined moving body waiting area 70, the electric moving body being used by the user; and a moving body charge-discharge control unit 14 for charging or discharging a storage battery in the waiting period, the storage battery 61*a*** being provided in the electric moving body left in the moving body waiting area.

5 Claims, 4 Drawing Sheets

(51) Int. Cl.
*B60L 53/31* (2019.01)
*H02J 7/14* (2006.01)

(58) Field of Classification Search
CPC .......... B60L 53/63; B60L 53/64; B60L 53/65; B60L 53/66; B60L 53/67; B60L 53/68; B60L 55/00
USPC .......................................... 320/109, 132, 134
See application file for complete search history.

(56) References Cited

U.S. PATENT DOCUMENTS

2015/0042278 A1* 2/2015 Leary ........................ B60L 1/02 901/30
2015/0094957 A1* 4/2015 Hyde ...................... B60L 53/63 701/537
2015/0149221 A1* 5/2015 Tremblay .............. B60L 53/665 320/109
2016/0221456 A1* 8/2016 Rhodes ................... B60L 53/14
2016/0311334 A1* 10/2016 Moravick ............... B60L 53/14
2017/0176195 A1* 6/2017 Rajagopalan ........... B60L 58/12
2018/0241229 A1* 8/2018 Kitaoka .................. B60L 53/51
2018/0361870 A1* 12/2018 Zhao ....................... B60L 53/14
2019/0232792 A1* 8/2019 Ahmed ................... B60L 53/66
2020/0317075 A1 10/2020 Yokoyama et al.
2020/0317080 A1* 10/2020 Jeon ........................ B60L 53/66
2021/0180970 A1* 6/2021 Park ........................ B60L 58/13
2021/0291694 A1* 9/2021 Shaaban ................. B60L 53/67
2022/0024494 A1* 1/2022 Bonanni ............... B60W 40/12
2022/0048399 A1 2/2022 Nishita et al.
2022/0050143 A1* 2/2022 Maeda ................. G01R 31/382
2022/0051568 A1* 2/2022 Kessler ................ G06Q 10/063
2022/0065652 A1* 3/2022 Herman ............. G01C 21/3685
2023/0229979 A1* 7/2023 Kogo ...................... B60L 58/12 705/5
2024/0005236 A1* 1/2024 Okumura ................ B60L 53/63
2024/0083453 A1* 3/2024 Caveney ............. B60W 60/001

FOREIGN PATENT DOCUMENTS

JP 2010-231258 A 10/2010
JP 2011-205828 A 10/2011
JP 2014-11849 A 1/2014
JP 2015-231324 A 12/2015
JP 2019-153114 A 9/2019
JP 2021-170868 A 10/2021
WO 2010-070985 5/2012
WO 2019/130930 A1 7/2019

OTHER PUBLICATIONS

German Office Action dated Jul. 8, 2024 issued in corresponding German application No. 10 2022 129 108.1 (7 pages).
Japanese Office Action dated Jun. 27, 2023 issued in corresponding Japanese application No. 2021-186848; English translation included (15 pages).
Chinese Office Action dated May 27, 2026 issued in corresponding Chinese application No. 202211422120; English machine translation included (19 pages).

* cited by examiner

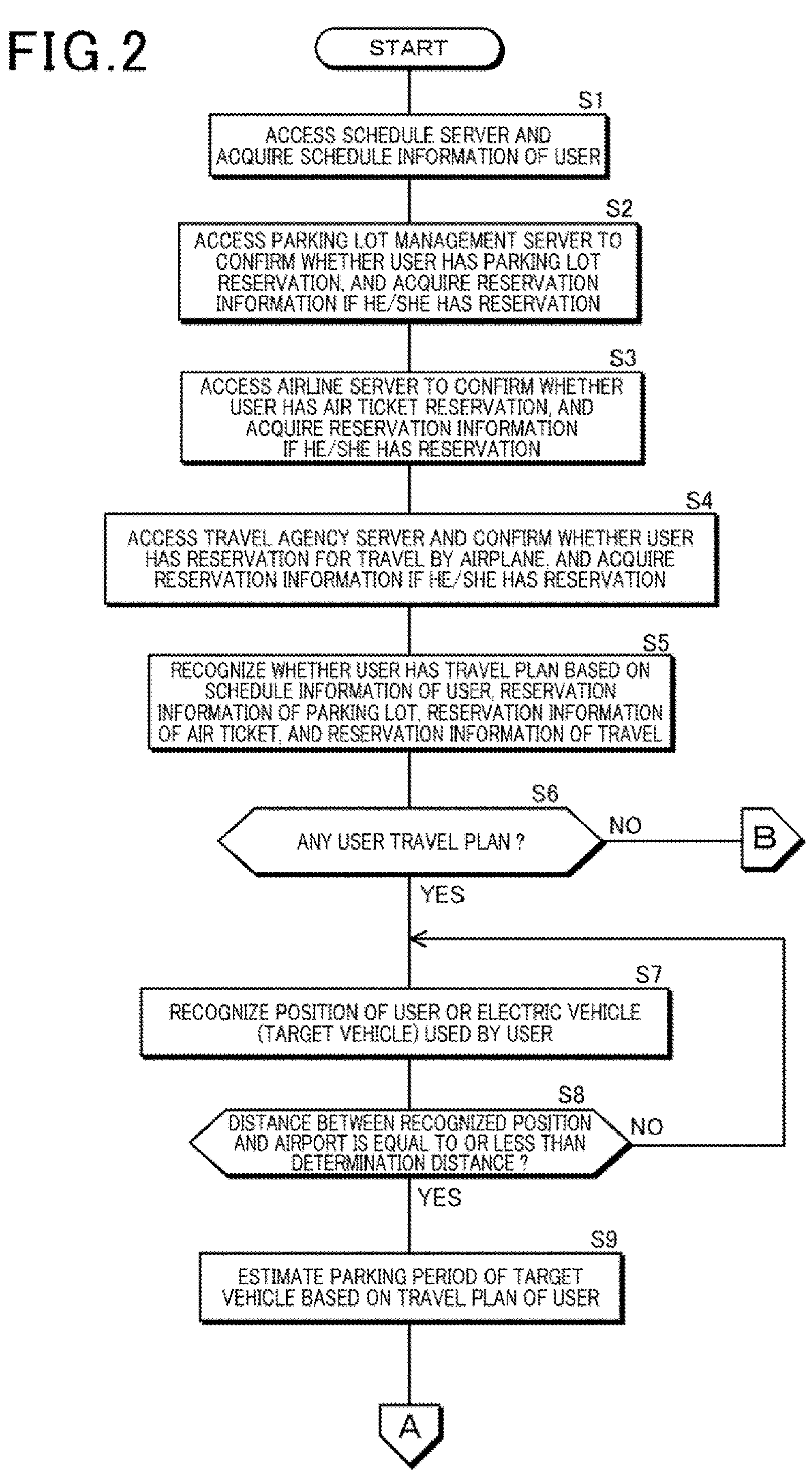
FIG.2
START
S1
ACCESS SCHEDULE SERVER AND ACQUIRE SCHEDULE INFORMATION OF USER
S2
ACCESS PARKING LOT MANAGEMENT SERVER TO CONFIRM WHETHER USER HAS PARKING LOT RESERVATION, AND ACQUIRE RESERVATION INFORMATION IF HE/SHE HAS RESERVATION
S3
ACCESS AIRLINE SERVER TO CONFIRM WHETHER USER HAS AIR TICKET RESERVATION, AND ACQUIRE RESERVATION INFORMATION IF HE/SHE HAS RESERVATION
S4
ACCESS TRAVEL AGENCY SERVER AND CONFIRM WHETHER USER HAS RESERVATION FOR TRAVEL BY AIRPLANE, AND ACQUIRE RESERVATION INFORMATION IF HE/SHE HAS RESERVATION
S5
RECOGNIZE WHETHER USER HAS TRAVEL PLAN BASED ON SCHEDULE INFORMATION OF USER, RESERVATION INFORMATION OF PARKING LOT, RESERVATION INFORMATION OF AIR TICKET, AND RESERVATION INFORMATION OF TRAVEL
S6
ANY USER TRAVEL PLAN ?
NO
B
YES
S7
RECOGNIZE POSITION OF USER OR ELECTRIC VEHICLE (TARGET VEHICLE) USED BY USER
S8
DISTANCE BETWEEN RECOGNIZED POSITION AND AIRPORT IS EQUAL TO OR LESS THAN DETERMINATION DISTANCE ?
NO
YES
S9
ESTIMATE PARKING PERIOD OF TARGET VEHICLE BASED ON TRAVEL PLAN OF USER
A

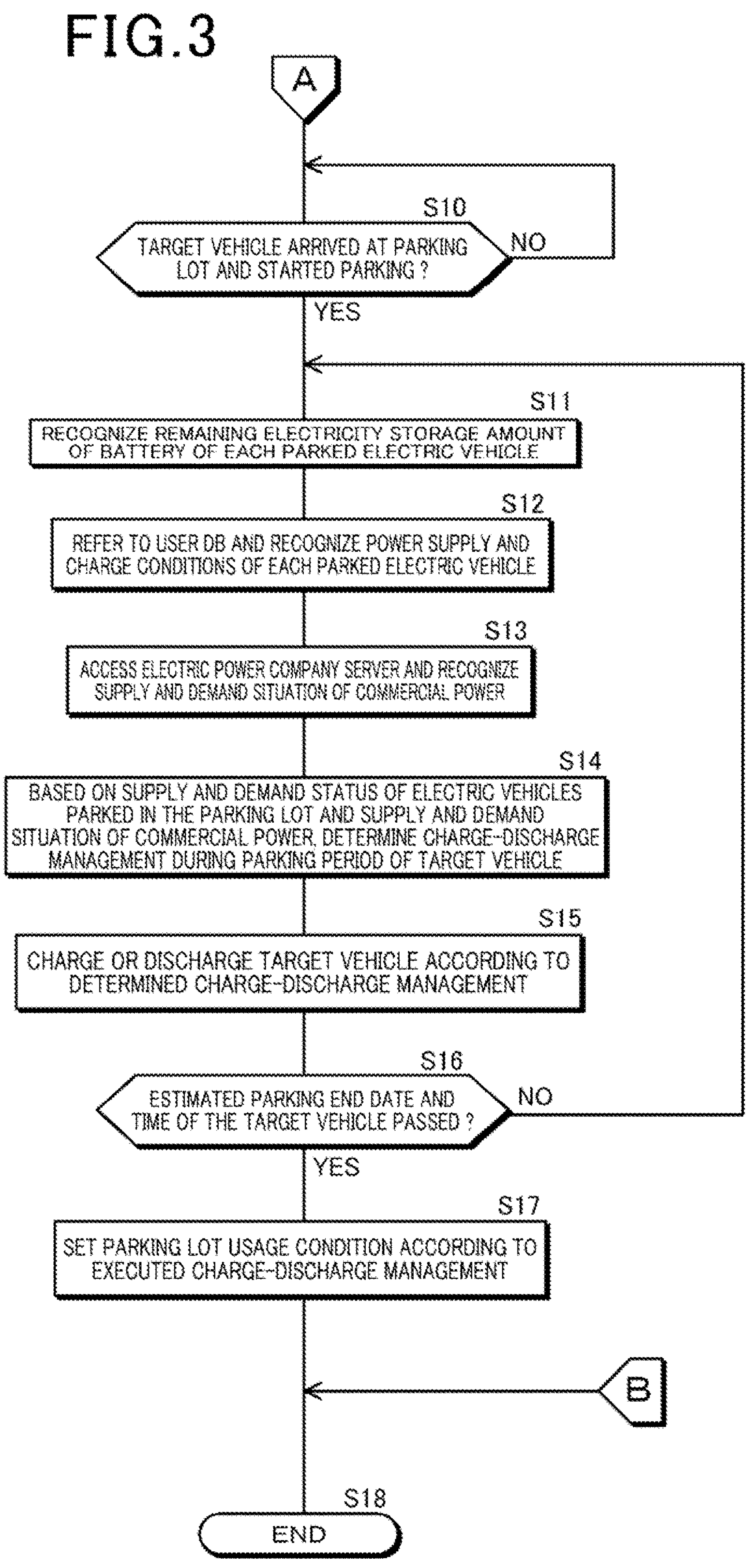
FIG.3
A
S10
TARGET VEHICLE ARRIVED AT PARKING LOT AND STARTED PARKING ?
NO
YES
S11
RECOGNIZE REMAINING ELECTRICITY STORAGE AMOUNT OF BATTERY OF EACH PARKED ELECTRIC VEHICLE
S12
REFER TO USER DB AND RECOGNIZE POWER SUPPLY AND CHARGE CONDITIONS OF EACH PARKED ELECTRIC VEHICLE
S13
ACCESS ELECTRIC POWER COMPANY SERVER AND RECOGNIZE SUPPLY AND DEMAND SITUATION OF COMMERCIAL POWER
S14
BASED ON SUPPLY AND DEMAND STATUS OF ELECTRIC VEHICLES PARKED IN THE PARKING LOT AND SUPPLY AND DEMAND SITUATION OF COMMERCIAL POWER, DETERMINE CHARGE-DISCHARGE MANAGEMENT DURING PARKING PERIOD OF TARGET VEHICLE
S15
CHARGE OR DISCHARGE TARGET VEHICLE ACCORDING TO DETERMINED CHARGE-DISCHARGE MANAGEMENT
S16
ESTIMATED PARKING END DATE AND TIME OF THE TARGET VEHICLE PASSED ?
NO
YES
S17
SET PARKING LOT USAGE CONDITION ACCORDING TO EXECUTED CHARGE-DISCHARGE MANAGEMENT
B
S18
END

| USER ID | VEHICLE ID | PARKING START DATE AND TIME (ESTIMATED/ACTUAL) | PARKING END DATE AND TIME (ESTIMATED/ACTUAL) | POWER SUPPLY AND CHARGE CONDITIONS | USAGE CONDITION |
|---|---|---|---|---|---|
| UID-1 | CID-1 | (ESTIMATED) OCTOBER 10th 13:00<br>(ACTUAL) OCTOBER 10th 13:05 | (ESTIMATED) OCTOBER 13th 17:00<br>(ACTUAL) - | POWER SUPPLY IS POSSIBLE, AND RECOVER REMAINING AMOUNT UP TO REMAINING AMOUNT AT START OF PARKING | RANK A |
| UID-1 | CID-2 | (ESTIMATED) OCTOBER 5th 9:00<br>(ACTUAL) OCTOBER 5th 9:10 | (ESTIMATED) OCTOBER 12th 17:00<br>(ACTUAL) - | NO POWER SUPPLY IS POSSIBLE, AND FULLY CHARGE BY END OF PARKING | RANK C |
| UID-3 | CID-3 | (ESTIMATED) OCTOBER 12th 13:00<br>(ACTUAL) OCTOBER 12th 13:05 | (ESTIMATED) OCTOBER 15th 15:00<br>(ACTUAL) - | POWER SUPPLY IS POSSIBLE, AND FULLY CHARGE BY END OF PARKING | RANK B |
| UID-4 | CID-4 | (ESTIMATED) OCTOBER 7th 10:00<br>(ACTUAL) OCTOBER 7th 9:55 | (ESTIMATED) OCTOBER 10th 14:00<br>(ACTUAL) - | POWER SUPPLY IS POSSIBLE, AND RECOVER REMAINING AMOUNT UP TO REMAINING AMOUNT AT START OF PARKING | RANK A |
| UID-5 | CID-5 | (ESTIMATED) OCTOBER 10th 13:00<br>(ACTUAL) OCTOBER 10th 13:05 | (ESTIMATED) OCTOBER 20th 17:00<br>(ACTUAL) - | NO POWER SUPPLY IS POSSIBLE, AND NO CHARGE IS NEEDED | RANK C |
| : | : | : | : | : | : |

POWER STORAGE MANAGEMENT SYSTEM AND VEHICLE

INCORPORATION BY REFERENCE

The present application claims priority under 35 U.S.C. § 119 to Japanese Patent Application No. 2021-186848 filed on Nov. 17, 2021. The content of the application is incorporated herein by reference in its entirety.

BACKGROUND OF THE INVENTION

Field of the Invention

The present invention relates to a power storage management system.

Description of the Related Art

Conventionally, a system for reallocating electric power to assets in a power grid has been proposed to handle fluctuations and expected fluctuations in power demand by receiving and analyzing available electric power and usage history transmitted from a plurality of charging stations and electric automobiles in distributed locations in the power grid (see, for example, National Publication of International Patent Application No. 2010-70985). The analysis using the system is performed further in consideration of real-time input made by consumers regarding consumer preference, planned travel by electric automobiles, or planned charging.

The above conventional system receives the time and position scheduled for charging the electric automobile according to a travel plan (route for scheduled traveling and moving) using the electric automobile, and forecasts power demand. Disadvantageously, in the system, no electric automobile can be utilized as an asset of the power grid unless there is a travel plan that uses an electric automobile.

An object of the present invention, which has been made in view of this background, is to provide a power storage management system capable of more effectively utilizing an electric moving body, whose power source is electric power, such as an electric automobile for an asset of an electric power source.

SUMMARY OF THE INVENTION

An aspect to achieve the above object includes a power storage management system including: a travel plan recognition unit for recognizing a travel plan of a user; a moving body waiting period estimation unit for estimating a waiting period based on the travel plan, the waiting period being a period through which the user is to leave an electric moving body in a predetermined moving body waiting area, the electric moving body being managed by the user; and a moving body charge-discharge control unit for charging or discharging a storage battery in the waiting period, the storage battery being provided in the electric moving body left in the moving body waiting area.

The above storage management system may be configured such that the travel plan recognition unit recognizes the travel plan of the user based on at least one of: reservation information of a public transportation system, schedule information of the user, and reservation information of the moving body waiting area, the reservation information of the public transportation system being made by the user, the schedule information being registered in a scheduler used by the user, the reservation information of the moving body waiting area being made by the user.

The above storage management system may be configured such that the moving body waiting area is provided at a boarding and alighting point of a first public transportation system, and the moving body waiting period estimation unit estimates the waiting period based on reservation information of the first public transportation system, the reservation information being made by the user.

The above storage management system may further include a position recognition unit for recognizing a position of the user or the electric moving body, wherein the moving body waiting period estimation unit determines a timing for estimating the waiting period based on: a position of the user or the electric moving body; and a distance from the boarding and alighting point of a second public transportation system, the position being recognized by the position recognition unit, the distance being recognized from reservation information of the second public transportation system, the reservation information being made by the user.

The above storage management system may be configured such that the moving body charge-discharge control unit performs charge-discharge control, the charge-discharge control moving electric charges of storage batteries among the electric moving bodies left in the moving body waiting area, the storage batteries being provided in a plurality of the electric moving bodies.

The above storage management system may further include a usage condition setting unit for setting a usage condition of the moving body waiting area for the user, based on at least one of: a time during which the moving body charge-discharge control unit collects electric power by discharging the storage battery; an amount of electric power that the moving body charge-discharge control unit collects by discharging the storage battery; an actual waiting period through which the user leaves the electric moving body in the moving body waiting area; and a remaining electricity storage amount of the storage battery at a time when the user starts having the electric moving body wait in the moving body waiting area, the storage battery being provided in the electric moving body.

An another aspect to achieve the above object includes a vehicle comprising a battery and a processor, wherein when the vehicle is parked in a parking lot, the processor executes charging or discharging of the battery according to a charge-discharge management based on a period during which the vehicle is estimated to park in the parking lot.

The above vehicle may be configured such that the processor uses the battery to respond to an insufficient supply of commercial power from a power network connected to the vehicle via a charge-discharge device through discharge of the battery.

The above vehicle may be configured such that the processor determines the charge-discharge management based on information, on supply and demand situation of commercial power, provided from an electric power company server, and supply and demand situation of a battery of an other vehicle parked in the parking lot.

The above vehicle may be configured such that the processor transmits detection information of a current position of the vehicle to a power storage management system to make the power storage management system, which is an external system of the vehicle and which executes a charge-discharge management processing of the battery, to determine that the vehicle is parked in the parking lot.

The above vehicle may be configured such that the processor determines the charge-discharge management based on at least one of schedule information of a user of the vehicle, reservation information of the parking lot being made by the user of the vehicle, and reservation information of a trip by the user using a public transportation system in which a vicinity of the parking lot is set as a departure point and a return point.

The above vehicle may be configured such that further comprising a charging port to which a charge-discharge cable is connected.

The above vehicle may be configured such that the processor makes a power storage management system determine the charge-discharge management, the power storage management system which is an external system of the vehicle and executes a charge-discharge management processing of the battery.

The above vehicle may be configured such that the processor makes a mobile terminal used by a user of the vehicle transmit detection information of a current position of the vehicle to a power storage management system which is an external system of the vehicle and which executes a charge-discharge management processing of the battery.

The above vehicle may be configured such that the processor determines power supply and charging condition of the battery by the charge-discharge management based on a discharge amount of the vehicle parked in the parking lot.

The above vehicle may be configured such that the processor determines the charge-discharge management based on a remaining electricity storage amount of the battery.

The above vehicle may be configured such that the processor determines the charge-discharge management based on a continuous parking period of the vehicle at the parking lot.

An another aspect to achieve the above object includes a vehicle comprising a battery, a charging port to which a charge-discharge cable is connected, and a processor, wherein when the vehicle is parked in a parking lot and the charge-discharge cable of a charge-discharge device is connected to the charging port, the processor executes charging or discharging of the battery according to a charge-discharge management which is determined for the vehicle parked in the parking lot and which is based on a period during which the vehicle is estimated to park in the parking lot.

The above vehicle may be configured such that the processor estimates the period during which the vehicle is estimated to park in the parking lot based on at least one of schedule information of a user of the vehicle, reservation information of the parking lot being made by the user of the vehicle, and reservation information of a trip by the user using a public transportation system in which a vicinity of the parking lot is set as a departure point and a return point.

The above storage management system makes it possible to more effectively utilize an electric moving body whose power source is electric power as an asset of the electric power source.

BRIEF DESCRIPTION OF THE DRAWINGS

FIG. 2 is a first flowchart of charge-discharge management processing for a parked electric vehicle;

FIG. 3 is a second flowchart of charge-discharge management processing for the parked electric vehicle; and FIG. 4 is an explanatory diagram of information recorded in a user DB.

DETAILED DESCRIPTION OF THE PREFERRED EMBODIMENTS

1. Power Storage Management System Configuration

Figure 1:
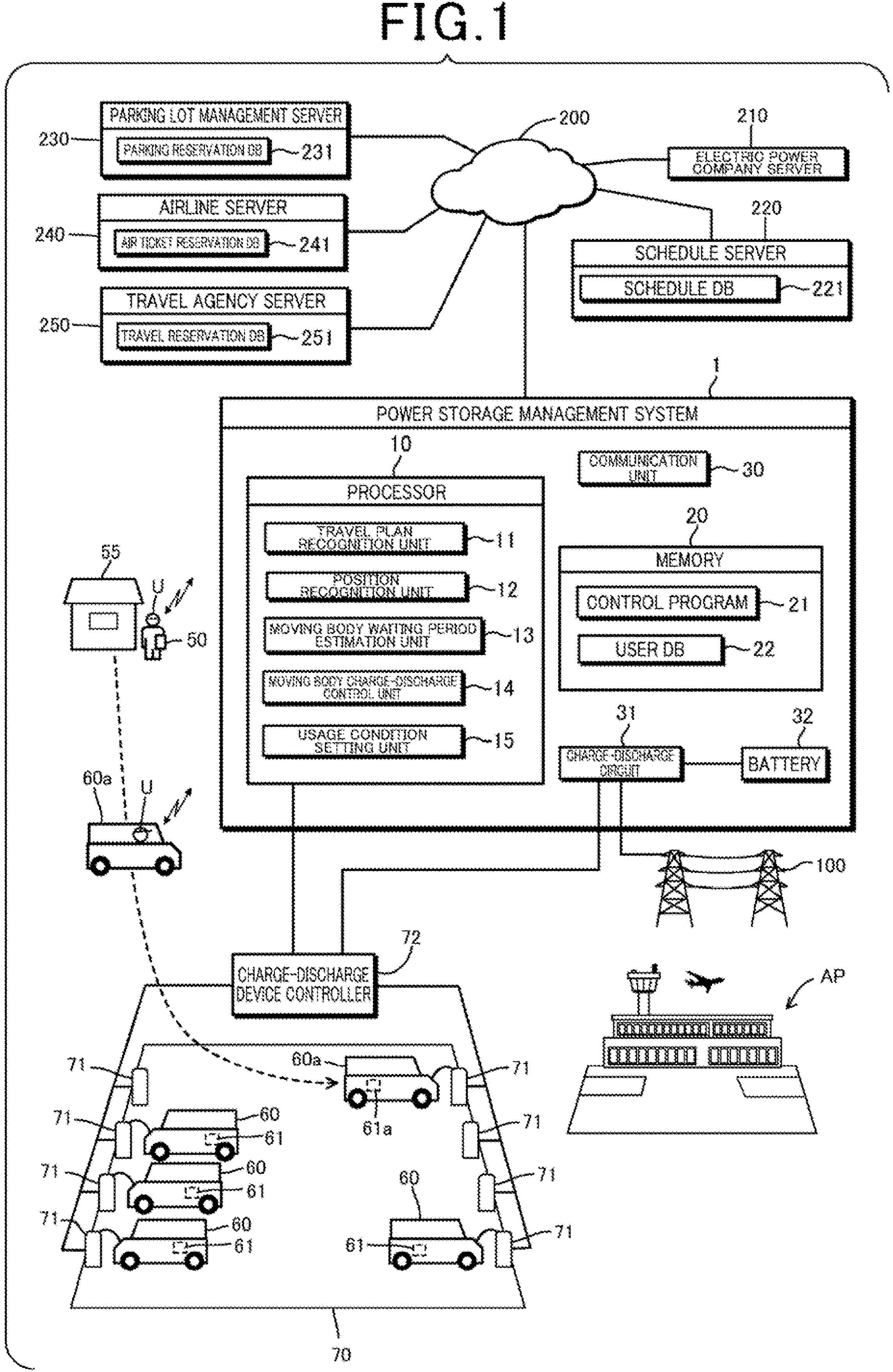
FIG. 1 is a configuration diagram of a power storage management system.

The following describes a configuration of a power storage management system 1 of the present embodiment with reference to FIG. 1. The power storage management system 1 performs charge-discharge management processing on a battery 61 (storage battery), provided in an electric vehicle 60, for the electric vehicle 60 parked in a parking lot 70 provided with an airport AP. A plurality of electric vehicles 60 can be parked in the parking lot 70, and a charge-discharge device 71 is installed in each parking space.

The electric vehicle 60 is an electric automobile, a plug-in hybrid automobile, or the like provided with a battery 61 as a power source. Charge-discharge cables of the charge-discharge device 71 are connected to the charging port of the electric vehicle 60, and thereby the charge-discharge device 71 charges and discharges the battery 61. The electric vehicle 60 corresponds to an electric moving body of the present disclosure. The charge-discharge device 71 detects the remaining electric charge amount in the battery 61 of the connected electric vehicle 60, and executes charge-discharge processing of the battery 61.

The charge-discharge device 71 is connected to a charge-discharge device controller 72. The charge-discharge device controller 72 is a control unit composed of a processor, a memory, an interface circuit, and the like. The charge-discharge device controller 72 receives input of battery status information indicating the status of the battery 61 detected by the charge-discharge device 71. Further, the control signal output from the charge-discharge device controller 72 to the charge-discharge device 71 sets what processing is performed to charge and discharge the battery 61 by the charge-discharge device 71.

The power storage management system 1 is a computer system composed of a processor 10, a memory 20, a communication unit 30, a charge-discharge circuit 31, a battery 32, and the like. The charge-discharge circuit 31 is connected to the charge-discharge device controller 72, and transmits electric power to and from the charge-discharge device 71 via the charge-discharge device controller 72. Further, the charge-discharge circuit 31 is connected to the commercial power grid 100 and transmits electric power (buys and sells electric power) to and from the commercial power grid 100. Here, the commercial power includes electric power generated by renewable energy (solar energy, wind power, geothermal power, etc.).

The battery 32 is connected to the charge-discharge circuit 31, is charged with the output electric power from the charge-discharge circuit 31, and supplies electric power to the charge-discharge circuit 31. The communication unit 30, via a communication network 200, communicates with: an electric power company server 210; a schedule server 220; a parking lot management server 230; an airline server 240; a travel agency server 250; a mobile terminal 50 used by a user U registered in the power storage management system 1; an electric vehicle 60*a* used by the user U; and the like. Although FIG. 1 illustrates one user U, in reality, the power storage management system 1 communicates with a plurality of mobile terminals 50 respectively used by a plurality of users U.

The electric power company server 210, the schedule server 220, the parking lot management server 230, the airline server 240, and the travel agency server 250 are computer systems composed of processors, memories, communication units, etc. (not shown). The mobile terminals 50 include smartphones, tablet terminals, and mobile phones.

The electric power company server 210 provides information such as excess or deficiency of commercial power (supply and demand situation), and commercial power charges. The schedule server 220 includes a schedule DB (database) 221 in which the action schedules of the plurality of users U are recorded. The schedule server 220 receives information on an action schedule of each of the plurality of users U and records it in the schedule DB 221. The information on the action schedule of the user U is set by the schedule application (application program) on each of the mobile terminals 50 of the plurality of users U, and is uploaded from the mobile terminal 50.

The parking lot management server 230 includes a parking reservation DB 231 in which the reservation status of the parking lot 70 is recorded. When the user U accesses the reservation site of the parking lot management company by using the mobile terminal 50 or the like and makes a reservation for the parking lot 70, the parking lot management server 230 records the reservation information of the parking lot 70 in the parking reservation DB 231. The airline server 240 includes an air ticket reservation DB 241 in which the reservation status of air tickets is recorded. When the user U accesses the reservation site of the airline by using the mobile terminal 50 or the like and makes a reservation for the air ticket, the airline server 240 records the reservation information of the air ticket in the air ticket reservation DB 241.

The travel agency server 250 includes a travel reservation DB 251 in which the travel reservation status is recorded. When the user U accesses a travel agency reservation site by using a mobile terminal 50 or the like and makes a reservation for a travel planned by the travel agency, the travel agency server 250 records the reservation information of the travel in the travel reservation DB 251.

The memory 20 of the power storage management system 1 stores the control program 21 of the power storage management system 1 and a user DB 22 is stored. In the user DB 22, there are recorded usage status of parking lot 70 brought about by the users U registered for the use of charge-discharge management using the power storage management system 1. As shown in FIG. 4, in the user DB 22, for each of the users U, there are recorded the following: an ID of the user U; a vehicle ID of the electric vehicle 60 used by the user U; a parking start date and time (estimated date and time and actual date and time of parking start) of the electric vehicle 60 in the parking lot 70; a parking end date and time (estimated date and time and actual date and time of parking end) of the electric vehicle 60 in the parking lot 70; power supply and charge conditions for the parked electric vehicle 60 specified by the user U; and information on a usage condition of the parking lot 70 set for each user U.

The user U specifies power supply and charge conditions including: whether to permit the battery 61 of the parked electric vehicle 60 to discharge and supply power to another electric vehicle 60 or the like (power supply is possible, or no power supply is possible); up to how much discharge is permitted if power supply is possible; and up to how much the remaining electricity storage amount of the battery, reduced by power supply, needs to be recovered by the end of parking. The usage condition is set according to the usage status of the parking lot 70 brought about by the user U. The details of setting the usage condition are to be described below.

The processor 10 reads and executes the control program 21 stored in the memory 20, and thereby functions as a travel plan recognition unit 11, a position recognition unit 12, a moving body waiting period estimation unit 13, a moving body charge-discharge control unit 14, and a usage condition setting unit 15. The travel plan recognition unit 11 accesses the schedule server 220, the parking lot management server 230, the airline server 240, and the travel agency server 250, to refer to the schedule DB 221, the parking reservation DB 231, the air ticket reservation DB 241, and the travel reservation DB 251, and thereby recognizes the travel plan of the user.

The position recognition unit 12 recognizes the position of the mobile terminal 50 or the electric vehicle **60*a* by receiving: detection information of the current position of the mobile terminal 50 transmitted from the mobile terminal 50 used by the user U; or detection information of the current position of the electric vehicle 60*a* transmitted from the electric vehicle 60*a* on which the user U rides. The mobile terminal 50 and the electric vehicle 60*a*** include a position detection sensor such as a GNSS (Global Navigation Satellite System) sensor.

The moving body waiting period estimation unit 13 estimates the period during which the user U parks the electric vehicle **60*a* in the parking lot 70 (corresponding to the waiting period of the present disclosure) based on the travel plan of the user U recognized by the travel plan recognition unit 11. For example, when the travel plan recognition unit 11 refers to the air ticket reservation DB 241 and recognizes a travel plan in which the user U uses an airplane with the airport AP as the departure point and the return point, the moving body waiting period estimation unit 13 estimates the period from the scheduled start date and time to the scheduled end date and time of the travel according to the travel plan to be the parking period, in which the user U is to park the electric vehicle 60*a* in the parking lot 70, and records the period in the user DB 22**.

The moving body charge-discharge control unit 14 charges and discharges the battery 61 mounted on the electric vehicle 60 according to the power supply and charge conditions recorded in the user DB 22, in the parking period of the electric vehicle 60 in the parking lot 70, which is estimated by the moving body waiting period estimation unit 13. The usage condition setting unit 15 sets the usage condition of the parking lot 70 for the user U (complimentary conditions such as discount of usage fee and priority reservation) according to the usage status of the parking lot 70 brought about by the user U.

2. Charge-Discharge Management Processing

According to the flowcharts shown in FIGS. 2 to 3, description is to be made on the charge-discharge management processing, which is executed by the power storage management system 1, for the battery 61 of the electric vehicle 60 parked in the parking lot 70. The following describes a case in which the user U rides on the electric vehicle **60*a* from his/her home 55 to the parking lot 70, parks the electric vehicle 60*a* in the parking lot 70, and travels by airplane with the airport AP as the departure point and the return point, as shown in FIG. 1**.

Steps S1 to S6 in FIG. 2 are processing performed by the travel plan recognition unit 11. In step S1, the travel plan recognition unit 11 accesses the schedule DB 221 of the schedule server 220 and acquires the schedule information of the user U. In the next step S2, the travel plan recognition unit 11 accesses the parking reservation DB 231 of the parking lot management server 230, confirms whether the user U has reserved the parking lot 70, and acquires the reservation information of the parking lot 70 if he/she has a reservation.

In the following step S3, the travel plan recognition unit 11 accesses the air ticket reservation DB 241 of the airline server 240, confirms whether the user U has reserved a ticket with the airport AP as the departure point and the return point, and acquires the air ticket reservation information if he/she has a reservation. In the next step S4, the travel plan recognition unit 11 accesses the travel reservation DB 251 of the travel agency server 250, confirms whether the user U has made a reservation for a travel using airplanes departing from and returning to the airport AP, and acquires the reservation information of the travel if he/she has a reservation.

In the following step S5, the travel plan recognition unit 11 recognizes whether the user U has a travel plan based on the schedule information of the user U, the reservation information of the parking lot 70, the reservation information of the air ticket, and the reservation information of the travel. Then, in the following step S6, the travel plan recognition unit 11 advances processing to step S7 if the user U has a travel plan. On the other hand, if the user U has no travel schedule, the travel plan recognition unit 11 advances processing to step S18 in FIG. 3. In this case, the charge-discharge management processing of the battery 61 of the electric vehicle 60*a* is not performed.

In the next step S7, the position recognition unit 12 acquires the position detection information transmitted from the mobile terminal 50 or the electric vehicle 60*a* used by the user U, and recognizes the position of the user U or the electric vehicle 60*a*. In the next step S8, the moving body waiting period estimation unit 13 determines whether the distance between the user U or the electric vehicle 60*a* and the airport AP is equal to or less than the determination distance (for example, set to about several km). Then, the moving body waiting period estimation unit 13 advances processing to step S9 if the distance between the user U or the electric vehicle 60*a* and the airport AP is equal to or less than the determination distance, and advances processing to step S7 if the distance between the user U or the electric vehicle 60 and the airport AP is greater than the determination distance. Steps S7 to S8 are processing for determining the actual execution of the travel plan of the user U based on the fact that the user U approaches the airport AP, and determining the timing for estimating the parking period.

In step S9 of FIG. 3, the moving body waiting period estimation unit 13 estimates the period through which the user U parks the electric vehicle 60*a* in the parking lot 70 based on the travel plan of the user U. The moving body waiting period estimation unit 13 records the estimated parking period in the user DB 22. The following steps S10 to S16 in FIG. 3 are processing performed by the moving body charge-discharge control unit 14.

In step S10, the moving body charge-discharge control unit 14 determines whether the electric vehicle 60*a* arrives at the parking lot 70 and starts parking by communicating with the charge-discharge device controller 72 or by communicating with the electric vehicle 60*a*. Then, when the electric vehicle 60*a* arrives at the parking lot 70 and starts parking, the moving body charge-discharge control unit 14 advances processing to step S11. In step S16, the moving body charge-discharge control unit 14 repeatedly executes the processing of steps S11 to S15 until the moving body charge-discharge control unit 14 recognizes that the estimated parking end date and time of the electric vehicle 60*a* in the parking lot 70 has passed.

In step S11, the moving body charge-discharge control unit 14 recognizes the remaining electricity storage amount of the battery 61 of each electric vehicle 60 parked in the parking lot 70 by communicating with the charge-discharge device controller 72. In the next step S12, the moving body charge-discharge control unit 14 refers to the user DB 22 and recognizes the power supply and discharging conditions of each electric vehicle parked in the parking lot 70.

In the following step S13, the moving body charge-discharge control unit 14 accesses the electric power company server 210 and recognizes the supply and demand situation of commercial power. In the next step S14, the moving body charge-discharge control unit 14 determines the charge-discharge management during the parking period of the electric vehicle 60*a* based on the supply and demand status of electric vehicles parked in the parking lot 70 and the supply and demand situation of commercial power. In the following step S15, the moving body charge-discharge control unit 14 executes charge or discharge processing of the electric vehicle 60*a* according to the determined charge-discharge management.

For example, in the user DB 22 shown in FIG. 4, the electric vehicle 60 whose vehicle ID is CID-1 parked by the user whose user ID is UID-1 is permitted to supply power. Therefore, when the power supply from the commercial power grid 100 is short, power is discharged from the battery 61. Then, this discharged power is supplied to another electric vehicle 60, so that the battery 61 of the other electric vehicle 60 is charged, or this discharged power is supplied to the commercial power grid 100 having shortage, so that the power is sold. Then, according to the power supply and charge conditions, the battery 61 is charged so that the remaining electric charge amount of the battery 61 becomes the level at the start of parking by the estimated parking end date and time of the electric vehicle 60.

Further, for the electric vehicle 60 whose vehicle ID is CID-2 parked by the user whose user ID is UID-2, the power supply and charge conditions determines that no power supply is possible, so that the battery 61 is not discharged and the battery is charged up to full charge. The power supply and charge conditions can be set such that, for example, power supply or charge is performed by a specified electric charge amount, or power supply (power selling) or charge (power buying) is performed for a specified amount of money.

The moving body charge-discharge control unit 14 advances processing to step S17 if the estimated parking end date and time of the electric vehicle 60*a* has passed in step S16. In step S17, the usage condition setting unit 15 sets the usage condition of the parking lot 70 for the user U according to the following setting conditions. The moving body charge-discharge control unit 14 sets, for example, the usage condition of the parking lot 70 for the user U in three steps of ranks C to A according to the following conditions.

Rank C is standard, rank B is a more preferential usage condition than rank C, and rank A is a more preferential usage condition than rank B. For example, rank C is set so that the usage fee is the standard fee, and the reservation acceptance start date is five days before; Rank B is set so that the usage fee is 80% of the standard fee, and the reservation acceptance start date is 10 days before; and Rank A is set so that the usage fee is 60% of the standard fee, and the reservation acceptance start date is 20 days before.

(Condition 1) The larger the discharge amount (power supply amount) in charge-discharge management, the higher the rank of the usage condition is set in such a way of rank C→rank B→rank A.

(Condition 2) The larger the remaining electric charge amount of the battery 61 at the start of parking, the higher the rank of the usage condition is set in such a way of rank C→rank B→rank A.

(Condition 3) The longer the continuous parking period of the electric vehicle 60, the higher the rank of the usage condition is set in such a way of rank C→rank B→rank A.

3. Other Embodiments

The above embodiment shows the electric vehicle 60 as the electric moving body of the present disclosure. However, the electric moving body of the present disclosure may be any moving body if its power source is a storage battery, and may be an electric moving body other than a vehicle such as a flying body or a ship. In the case of an electric flying body, the waiting area is a tarmac and the waiting period is the airplane parking period. In the case of an electric ship, the waiting area is a mooring area and the waiting period is the mooring period.

In the above embodiment, the travel plan recognition unit 11 recognizes the travel plan of the user based on the schedule, air ticket reservation, travel reservation, and parking lot reservation status of the user. Another embodiment may be such that a travel plan of the user is recognize based on at least one of schedule, air ticket reservation status, travel reservation status, and parking lot reservation status of the user. Further, the travel plan of the user may be recognized based on information other than these.

In the above embodiment, a position recognition unit 12 is provided to recognize when the position of the user U or the electric vehicle 60*a* is near the parking lot 70. At this time, the moving body waiting period estimation unit 13 estimates the parking period of the electric vehicle 60*a*. Another embodiment may be such that the position recognition unit 12 is omitted and the parking period may be estimated for the electric vehicle 60*a* at another timing such as when the electric vehicle 60*a* is parked in the parking lot 70.

In the above embodiment, the usage condition setting unit 15 is provided to set the usage condition of the parking lot for the user U based on: the results, made by the user, of charge-discharge management during parking of the electric vehicle 60*a* in the parking lot 70; and the usage results, made by the user, of the parking lot 70. However, the configuration may be such that the usage condition setting unit 15 is omitted.

The above embodiment uses airplanes to illustrate a public transportation system used by the user U for travel, but the same processing can be applied when other public transportation system such as railroads, buses, or ships is used. For example, when the user U has a travel plan to use a railroad, it is possible to perform charge-discharge management processing of the battery 61 for the electric vehicle 60 parked in the parking lot near the departure and return stations of the train to be used.

Note that FIG. 1 is a schematic diagram showing the configuration of the power storage management system 1 divided based on main things to be processed to facilitate the understanding of the invention of the present application, and the power storage management system 1 may be composed of another division. In addition, the processing of each component may be executed by one hardware unit, or may be executed by a plurality of hardware units. Further, the processing by each component according to the flowcharts shown in FIGS. 2 to 3 may be executed by one program, or may be executed by a plurality of programs.

4. Configuration Supported by the Above Embodiments

The above embodiments are specific examples of the following configurations.

(Configuration 1)

A power storage management system, including: a travel plan recognition unit for recognizing a travel plan of a user; a moving body waiting period estimation unit for estimating a waiting period based on the travel plan, the waiting period being a period through which the user is to leave an electric moving body in a predetermined moving body waiting area, the electric moving body being managed by the user; and a moving body charge-discharge control unit for charging or discharging a storage battery in the waiting period, the storage battery being provided in the electric moving body left in the moving body waiting area.

The power storage management system of configuration 1 makes it possible to utilize an electric moving body whose power source is electric power more effectively as an asset of the electric power source.

(Configuration 2)

The power storage management system according to configuration 1, wherein the travel plan recognition unit recognizes the travel plan of the user based on at least one of reservation information of a public transportation system, schedule information of the user, and reservation information of the moving body waiting area, the reservation information of the public transportation system being made by the user, the schedule information being registered in a scheduler used by the user, the reservation information of the moving body waiting area being made by the user.

The power storage management system of configuration 2 makes it possible to recognize the travel plan of the user based on action schedule of the user.

(Configuration 3)

The power storage management system according to configuration 2, wherein the moving body waiting area is provided at a boarding and alighting point of a first public transportation system, and the moving body waiting period estimation unit estimates the waiting period based on reservation information of the first public transportation system, the reservation information being made by the user.

The power storage management system of the configuration 3 makes it possible, when the user makes a reservation for the first public transportation system, to estimate that the electric moving body is left in the moving body waiting area while the user moves by electric moving body to the moving body waiting area provided at the boarding and alighting point of the first public transportation and travels using the first public transportation. Therefore, the moving body waiting period estimation unit can estimate the waiting period of the electric moving body based on the reservation information, made by the user, of the first public transportation system.

(Configuration 4)

The power storage management system according to configuration 2 or 3, further including a position recognition unit for recognizing a position of the user or the electric moving body, wherein the moving body waiting period estimation unit determines a timing for estimating the waiting period based on: a position of the user or the electric moving body; and a distance from the boarding and alighting point of a second public transportation system, the position being recognized by the position recognition unit, the distance being recognized from reservation information of the second public transportation system, the reservation information being made by the user.

The power storage management system of the configuration 4 allows the moving body waiting period estimation unit to estimate the waiting period of the electric moving body at a timing when it is determined that the user is heading for the boarding and alighting point of the second public transportation system to use the second public transportation system and that the travel scheduled by the travel plan is actually being carried out, based on the distance between the position of the user or the electric moving body and the boarding and alighting point of the second public transportation system.

(Configuration 5)

The power storage management system according to any one of configuration 1 to 4, wherein the moving body charge-discharge control unit performs charge-discharge control, the charge-discharge control moving electric charges of storage batteries among a plurality of the electric moving bodies left in the moving body waiting area, the storage batteries being provided in a plurality of the electric moving bodies.

The power storage management system of the configuration 5 makes it possible to exchange the electric charges stored in the storage batteries of the plurality of electric moving bodies, which are left in the moving body waiting area, among the electric moving bodies and thereby to effectively utilize the electric charges stored in the storage batteries.

(Configuration 6)

The power storage management system according to any one of configuration 1 to 5, further including a usage condition setting unit for setting a usage condition of the moving body waiting area for the user, based on at least one of: a time during which the moving body charge-discharge control unit collects electric power by discharging the storage battery; an amount of electric power that the moving body charge-discharge control unit collects by discharging the storage battery; an actual waiting period through which the user leaves the electric moving body in the moving body waiting area; and a remaining electricity storage amount of the storage battery at a time when the user starts having the electric moving body wait in the moving body waiting area, the storage battery being provided in the electric moving body.

The power storage management system of the configuration 6 makes it possible to set the usage condition of the moving body waiting area according to the utilization status of the electric charge of the storage battery when the user leaves the electric moving body in the moving body waiting area or the ease for utilizing the electric charge of the storage battery and thereby to promote the utilization of the electric charges in the storage batteries of the electric moving bodies left in the moving body waiting space.

REFERENCE SIGNS LIST

1 . . . power storage management system, 10 . . . processor, 11 . . . travel plan recognition unit, 12 . . . position recognition unit, 13 . . . moving body waiting period estimation unit, 14 . . . moving body charge-discharge control unit, 15 . . . usage condition setting unit, 20 . . . memory, 21 . . . control program, 22 . . . user DB, 30 . . . communication unit, 31 . . . charge-discharge circuit, 32 . . . battery, 50 . . . mobile terminal, 60 . . . electric vehicle, 61 . . . battery (storage battery), 70 . . . parking lot (waiting area), 71 . . . charge-discharge device, 72 . . . charge-discharge device controller, 100 . . . commercial power grid, 200 . . . communication network, 210 . . . electric power company server, 220 . . . schedule server, 221 . . . schedule DB, 230 . . . parking lot management server, 231 . . . parking reservation DB, 240 . . . airline server, 241 . . . air ticket reservation DB, 250 . . . travel agency server, 251 . . . travel agency DB, U . . . user, AP . . . airport.

What is claimed is:

1. A power storage management system, comprising a processor that, via a communication network, communicates with: a mobile terminal used by a user; or an electric moving body used by the user, which includes a position detection sensor, and that acquires a current position of the mobile terminal or the electric moving body, wherein the processor functions as:

a travel plan recognition unit for recognizing a travel plan including scheduled start date and time and scheduled end date and time of a travel of the user;

a position recognition unit for recognizing the current position of the user or the electric moving body;

a moving body waiting period estimation unit for estimating a period from the scheduled start date and time to the scheduled end date and time of the travel as a waiting period based on the travel plan, the waiting period being a period through which the user is to leave the electric moving body in a predetermined moving body waiting area, determines a timing for estimating the waiting period based on a distance between the current position of the user or the electric moving body and a boarding and alighting point of a public transportation system, the current position being recognized by the position recognition unit, the boarding and alighting point being recognized from reservation information of the public transportation system, the reservation information being made by the user; and a moving body charge-discharge control unit for charging to or discharging from a commercial power grid or an other electric moving body, a storage battery in the waiting period, the storage battery being provided in the electric moving body left in the moving body waiting area, wherein the moving body waiting period estimation unit determines whether the distance between the current position of the user or the electric moving body and the boarding and alighting point is equal to or less than a determined distance, when the moving body waiting period estimation unit determines that the distance between the current position of the user or the electric moving body and the boarding and alighting point is greater than the determined distance, the moving body waiting period estimation unit, without estimating the waiting period, makes the position recognition unit re-acquire the current position of the mobile terminal or the electric moving body and re-recognize the current position of the mobile terminal or the electric moving body, when the moving body waiting period estimation unit determines that the distance between the current position of the user or the electric moving body and the boarding and alighting point is equal to or less than the determination distance, the moving body waiting period estimation unit estimates the waiting period, in the waiting period estimated by the moving body waiting period estimation unit, the moving body charge-discharge control unit makes a charge-discharge device charge to or discharge from the commercial power grid or the other electric moving body, the storage battery provided in the electric moving body left in the moving body waiting area.

2. The power storage management system according to claim 1, wherein the travel plan recognition unit recognizes the travel plan of the user based on at least one of: reservation information of a public transportation system, schedule information of the user, and reservation information of the moving body waiting area, the reservation information of the public transportation system being made by the user, the schedule information being registered in a scheduler used by the user, the reservation information of the moving body waiting area being made by the user.

3. The power storage management system according to claim 2, wherein the moving body waiting area is provided at a boarding and alighting point of a first public transportation system, and the moving body waiting period estimation unit estimates the waiting period based on reservation information of the first public transportation system, the reservation information being made by the user.

4. The power storage management system according to claim 1, wherein the moving body charge-discharge control unit performs charge-discharge control, the charge-discharge control moving electric charges of storage batteries among a plurality of the electric moving bodies left in the moving body waiting area, the storage batteries being provided in a plurality of the electric moving bodies.

5. The power storage management system according to claim 1, wherein the processor further functions as a usage condition setting unit for setting a usage condition of the moving body waiting area for the user, based on at least one of: a time during which the moving body charge-discharge control unit collects electric power by discharging the storage battery; an amount of electric power that the moving body charge-discharge control unit collects by discharging the storage battery; a waiting period through which the user leaves the electric moving body in the moving body waiting area; and a remaining electricity storage amount of the storage battery at a time when the user starts having the electric moving body wait in the moving body waiting area, the storage battery being provided in the electric moving body.

* * * * *